US006526928B2

(12) United States Patent
Bauer et al.

(10) Patent No.: US 6,526,928 B2
(45) Date of Patent: Mar. 4, 2003

(54) ELECTROMAGNETIC MULTIPLE ACTUATOR

(75) Inventors: Erwin Bauer, Regensburg (DE); Albert Hoerl-Liegl, Taufkirchen/Vils (DE); Ferdinand Loebbering, Alteglofsheim (DE); Stefan Loidl, Emmering (DE)

(73) Assignees: Siemens Aktiengesellschaft, Munich (DE); Bayerische Motoren AG, Munich (DE)

( * ) Notice: Subject to any disclaimer, the term of this patent is extended or adjusted under 35 U.S.C. 154(b) by 0 days.

(21) Appl. No.: 09/992,998

(22) Filed: Nov. 14, 2001

(65) Prior Publication Data

US 2002/0041222 A1 Apr. 11, 2002

Related U.S. Application Data

(63) Continuation of application No. PCT/DE00/01500, filed on May 12, 2000.

(30) Foreign Application Priority Data

May 14, 1999 (DE) ........................................ 199 22 427

(51) Int. Cl.[7] ........................... F16K 31/02; F01L 9/04; H01F 7/08

(52) U.S. Cl. .............................. 123/90.11; 251/129.09; 251/129.1; 251/129.16; 335/266; 335/256; 335/267

(58) Field of Search ................................ 335/259, 267, 335/256, 266, 268, 278; 251/129.16, 129.09, 129.1; 123/90.11

(56) References Cited

U.S. PATENT DOCUMENTS

| | | | | |
|---|---|---|---|---|
| 4,533,890 A | | 8/1985 | Patel | 335/234 |
| 4,715,331 A | * | 12/1987 | Kreuter | 123/90.11 |
| 4,884,900 A | | 12/1989 | Pirault et al. | 384/434 |
| 5,072,700 A | | 12/1991 | Kawamura | 123/90.11 |
| 5,238,098 A | | 8/1993 | Mori | 198/358 |
| 5,720,468 A | | 2/1998 | Morinigo | 251/129.1 |
| 5,769,043 A | | 6/1998 | Nitkiewicz | 123/90.11 |
| 5,875,746 A | * | 3/1999 | Izuo | 123/193.5 |
| 6,016,778 A | | 1/2000 | Koch | 123/90.11 |

FOREIGN PATENT DOCUMENTS

| | | |
|---|---|---|
| DE | 195 06 566 A 1 | 8/1996 |
| DE | 197 35 375 C 1 | 7/1998 |
| DE | 197 06 106 A 1 | 8/1998 |
| DE | 197 14 496 A 1 | 10/1998 |
| EP | 0 493 634 A1 | 7/1992 |
| EP | 0 500 389 A1 | 8/1992 |
| EP | 0 821 140 A1 | 1/1998 |
| JP | 03185207 | 8/1991 |

OTHER PUBLICATIONS

International Search Report for PCT/DE00/01500, issued by the European Patent Office on Oct. 9, 2000.

* cited by examiner

*Primary Examiner*—Ramon M. Barrera
(74) *Attorney, Agent, or Firm*—Laurence A. Greenberg; Werner H. Stemer; Ralph E. Locher

(57) ABSTRACT

The multiple actuator for an electromechanically actuated valve has a housing and a plurality of armature shafts extending through the housing. Each of the armature shafts carry an armature, and two electromagnets which both lie inside the housing. Two springs act on each armature, forcing it into a position of repose between the electromagnets. This configuration makes optimum use of the available basic area above a valve which is to be driven. The armature has a maximum surface area, and optimum dissipation of heat through thermal conduction is possible via the corresponding housing underside.

8 Claims, 3 Drawing Sheets

ELECTROMAGNETIC MULTIPLE ACTUATOR

Cross-Reference to Related Application

This application is a continuation of copending International Application No. PCT/DE00/01500, filed May 12, 2000, which designated the United States.

BACKGROUND OF THE INVENTION

Field of the Invention

The invention relates to an electromagnetic multiple actuator, in particular an actuator for two gas exchange valves of an internal-combustion engine.

Actuators for gas exchange valves of internal-combustion engines are known. Unlike camshaft-actuated valves, electromagnetically driven valves are made to open and close in dependence on the rotational position of the crankshaft. The actuator must thereby be able to apply high forces, in particular when opening a discharge valve, and the respective limit position of the gas exchange valve has to be reliably reached during opening and closing.

An electromagnetic actuator is disclosed, for example, in the commonly assigned U.S. Pat. No. 6,016,778 (see German patent DE 197 35 375 C2). That actuator has an armature which is held in a center position between two electromagnets by two springs. When current is applied to one of the electromagnets, the armature is drawn into the respective limit position associated with the electromagnet and it can be held in that position. To transfer the actuator and therefore the gas exchange valve driven by it from one limit position into the other, the application of current to the holding coil is ended, and current is applied to the other coil. As a result, the armature is moved into the other limit position under the force of the springs and of the electromagnet which has been switched on.

To control the movement of the actuator, for example to control the valve movement in an internal-combustion engine, the lifting movement of the actuator has to be continuously measured. In an internal-combustion engine, the valve lift of a gas exchange valve is usually 8 mm.

This lift has to be measured to an accuracy of approximately 1/100 mm to allow effective valve control.

To achieve this, it is known to measure the inductance of the winding of an electromagnet (see U.S. Pat. No. 5,238,098 and European patent application EP 0 500 389) or to use an eddy-current sensor or an optical position sensor (see U.S. Pat. No. 5,072,700 and European patent application EP 0 493 634) in order to detect the position of the armature.

The electromagnetic drive of the actuator has to apply considerable forces, with the result that, firstly, the surface area of the armature and of the electromagnets should be selected to be as large as possible, and secondly there is a considerable thermal load on the electromagnets. However, the space available for an actuator which drives, for example, a gas exchange valve of an internal-combustion engine is limited.

One possibility of solving the thermal problems with an actuator of this type would be connection to a cooling circuit, for example to the cooling circuit of an internal-combustion engine. However, this would require an unacceptably high level of outlay.

Furthermore, the abovementioned actuators are relatively difficult to assemble, since they are constructed from a large number of individual parts.

SUMMARY OF THE INVENTION

It is accordingly an object of the invention to provide an electromagnetic actuator, which overcomes the above-mentioned disadvantages of the heretofore-known devices and methods of this general type and which is of compact design, is able to apply high forces, and does not need to be connected to a cooling circuit.

With the foregoing and other objects in view there is provided, in accordance with the invention, an electromagnetic multiple actuator, in particular for the gas exchange valves of an internal combustion engine. The actuator comprises:

a housing and at least two armature shafts extending through the housing, with each of the armature shafts having an armature attached thereto;

two electromagnets for each armature, each electromagnet having a coil core and a winding with the respective armature disposed between;

first and second springs respectively acting on each armature in opposite directions and forcing the armature into a position of repose between the electromagnets, and wherein each first spring is clamped between a part of the housing and an armature spring cup attached to the armature shaft.

In the novel concept according to the invention at least two individual actuators are combined to form a multiple actuator. A multiple actuator of this type has a housing, through which at least two armature shafts run, to each of which an armature is secured, which lies between two electromagnets and is held in an at-rest position, i.e., a position of repose, by two springs.

This construction enables the multiple actuator to bear over a large area against a cooled surface, for example the cylinder head of an internal-combustion engine, on the underside, i.e. the side which, for example, faces the gas exchange valves in an internal-combustion engine. In this configuration, the available surface area of this cooled part is optimally covered by the multiple actuator, since the gap which normally remains between individual actuators is no longer present. The combination of a plurality of individual actuators in one housing enables the surface areas of the armatures and their electromagnets to be maximized. Finally, the large-area side wall of the multiple actuator provides good thermal coupling of the top side of the actuator to the underside which bears against the cooled part.

In accordance with an added feature of the invention, the housing has a top side and a housing underside that is in contact with a cooled part. The housing is formed, on at least one side wall thereof, to assure good heat dissipation from the top side to the cooled housing underside.

In accordance with an additional feature of the invention, each armature shaft is guided in bushes inserted into the housing top side and the housing underside.

In accordance with another feature of the invention, washers are disposed to support the first springs on the housing, and the washers are adjustable in an axial direction for setting a spring force of the springs.

In accordance with a further feature of the invention, the housing is formed in two parts connected by bolts running through at least one side wall of the housing. The housing parts, in a further preferred embodiment of the invention, are produced by breaking apart a single-part housing, ensuring that the housing parts fit together. The construction according to the invention further reduces the number of parts in the actuator, which considerably simplifies assembly. The housing is thus initially produced as a single part and is then broken at desired breaking points, so that an optimum fit is achieved after the housing parts have been fitted together and are held together by bolts which run through at least one side wall.

In accordance with again an added feature of the invention, more than two armature shafts with respective armatures and associated electromagnets are provided, and the housing has a divider between two armatures and their electromagnets. The divider preferably has guide elements guiding at least one armature along an axis of the armature shaft.

In accordance with again a further feature of the invention, the coil core is a common coil core for a plurality of electromagnets.

With the above and other objects in view there is provided, in accordance with the invention, a combination of a cylinder head of an internal combustion engine with the multiple actuator according to the above-outlined invention for actuating gas exchange valves of the internal combustion engine. In that case, the second springs are each clamped between a valve spring cup attached to a valve shaft of the driven gas exchange valve, and the cylinder head wherein the gas exchange valves are guided.

The springs preferably lie outside the housing. This makes the coil cores easier to secure.

The housing is also responsible for the longitudinal guidance of the armatures along the axis of the armature shaft, so that there is no need for a separate rotational securing means, as is required in the prior art, since, on account of the longitudinal guidance, the armature can no longer follow the rotation caused by the springs.

The measurement of the position of the armatures of each actuator part is preferably carried out by contactless measurement by means of magnetic field-sensitive measurement sensors which are attached to the housing of the multiple actuator, and associated permanent magnets, which are each arranged in a fixed position with respect to the armature. Each permanent magnet generates a stray magnetic field. The associated magnetic field-sensitive measuring sensor, the signal of which is preferably dependent only on the direction of the magnetic field, records the position of the permanent magnet and therefore the position of the armature. If the multiple actuator drives gas exchange valves of an internal-combustion engine, the position of the armature is associated with that of the corresponding gas exchange valve.

The principle according to the invention can be applied to entire actuator arrays, for example all the actuators belonging to the inlet side or the outlet side of an internal-combustion engine can be combined in one actuator array. In order then to ensure the guidance of the armatures, it is possible to provide perpendicular dividing walls in the housing.

Other features which are considered as characteristic for the invention are set forth in the appended claims.

Although the invention is illustrated and described herein as embodied in an electromagnetic multiple actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
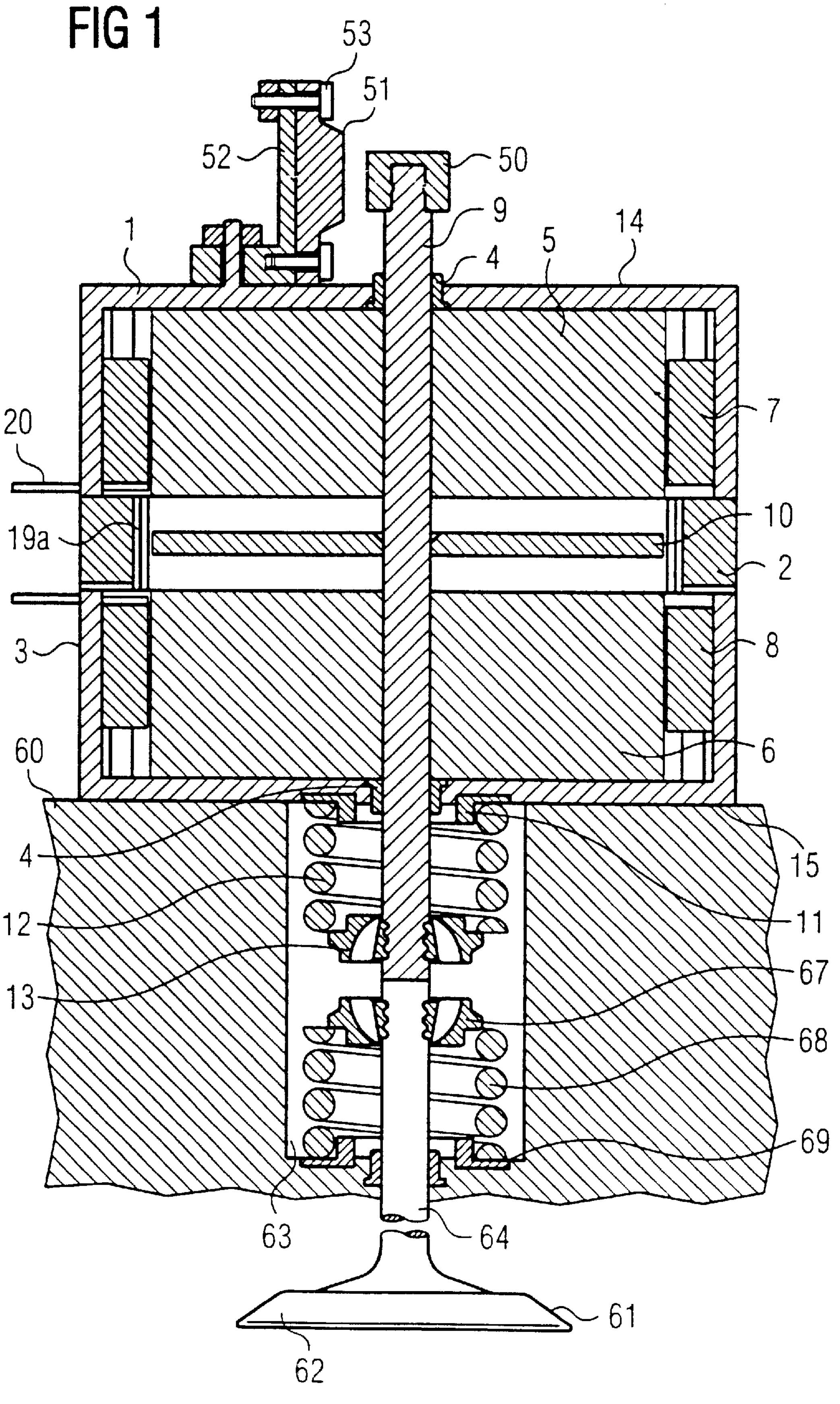
FIG. 1 is a sectional illustration through a multiple actuator according to the invention.

Referring now to the figures of the drawing in detail and first, particularly, to FIG. 1 thereof, there is shown a section through an electromagnetic multiple actuator which drives at least two poppet valves, which are gas exchange valves of an internal-combustion engine. By way of example, the multiple actuator drives two admission valves of a cylinder. However, the section shown in FIG. 1 only illustrates one of these valves, with the associated actuator part.

The electromagnetic multiple actuator illustrated in FIG. 1 is attached to the cylinder head 60 of an internal-combustion engine and drives a gas exchange valve. For this purpose, the multiple actuator, in a housing, has a plate-like armature 10 for each gas exchange valve which is to be driven. The armature is seated on an armature shaft 9 which in turn rests on a valve shaft 64. The armature shaft 9 projects into a recess 63 in the cylinder head 60 wherein the gas exchange valve is positioned, this valve having a valve cup 62 with valve seat 61.

The valve cup 62 is pressed upward toward a limit position, wherein the valve seat 61 closes the gas exchange valve, by a spring 68, which is clamped between a washer 69, which rests in the recess 63 against the cylinder head 60, and a valve spring cup 67 which is attached to the valve shaft 64.

The spring 68 also acts on the armature shaft 9 and the armature 10. It is counteracted by a spring 12 which is clamped between an armature spring cup 13, which is attached to the armature shaft, and a washer 11, which rests on the housing, and which presses the armature shaft 9 downward.

The armature 10 is situated in the housing, which is composed of a lower housing part 3, an upper housing part 1 and a housing center part 2, between two electromagnets. The lower electromagnet comprises a lower coil core 6 and a lower winding 8, and the upper electromagnet comprises an upper coil core 5 and an upper winding 7. The housing parts are screwed together.

The windings 7, 8 are energized by suitable driver circuits, which are activated by a non-illustrated control circuit.

The end faces of the coil cores are stops for the armature 10 and define the limit positions of the latter. When there is no current applied to the windings 7, 8, the springs 12, 68 hold the armature 10 in an at-rest position between these limit positions, out of which it can be moved by means of the electromagnets.

The three-part housing is produced as an aluminum pressure die casting. The housing parts 1, 2, 3 are held together by four stud bolts 58, which run from the housing top side 14 to the housing underside 15 and are screwed to the cylinder head 60.

A plurality of armature shafts 9 run through the housing of the electromagnetic multiple actuator. Each is guided in bushes 4. For each armature shaft 9, there is one bush 4 secured in the housing top part 1 and another secured in the housing lower part 3.

Figure 2:
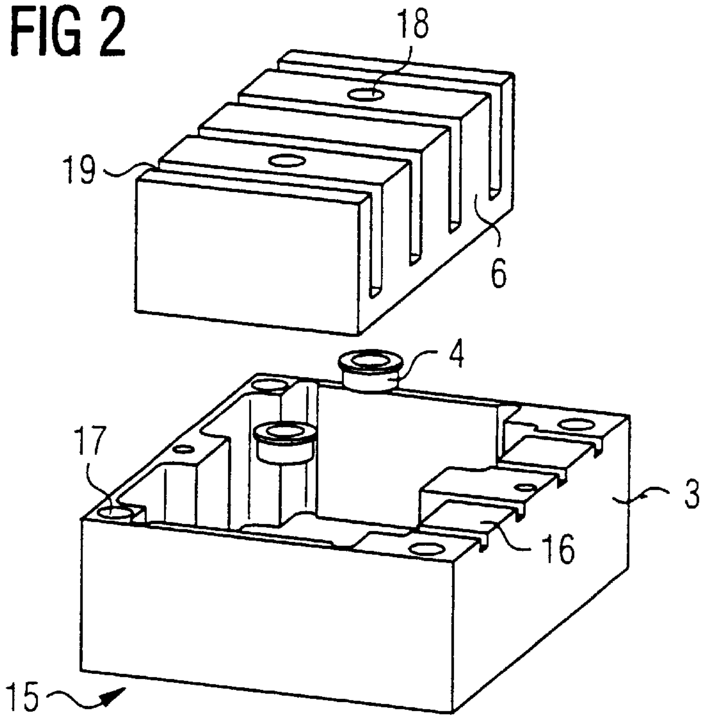
FIG. 2 is an exploded view of a housing lower part of a multiple actuator, with lower coil core and bushes.
Figure 3:
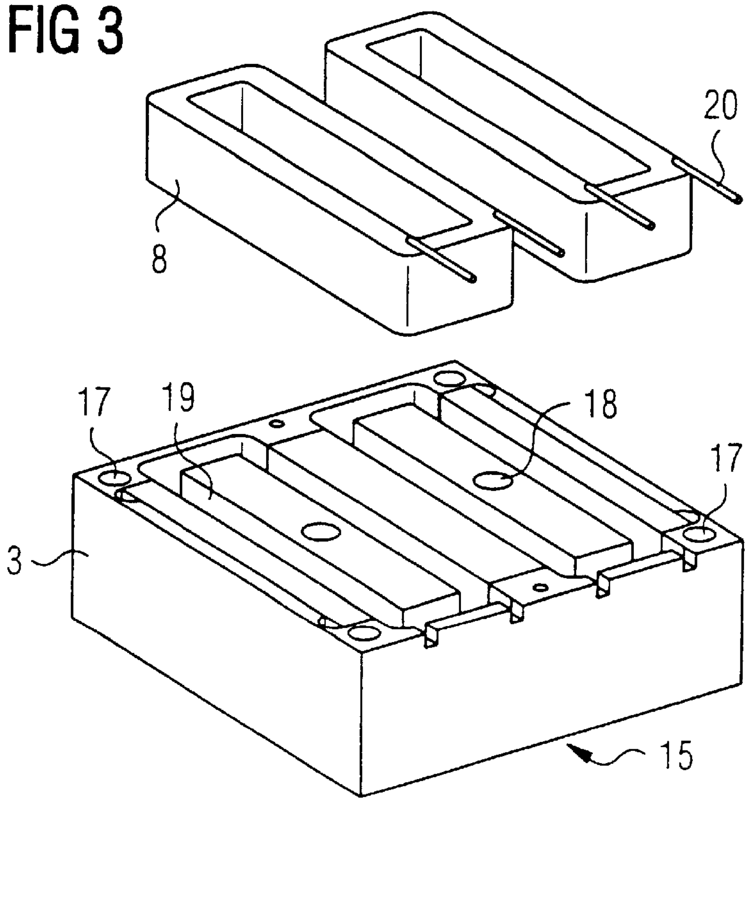
FIG. 3 is an exploded view of a housing lower part of a multiple actuator with installed coil core and with two lower windings.

FIGS. 2 and 3 show the lower housing part 3 together with the coil core 6 and the windings 8 in more detail.

It can be seen from FIG. 2 that for the multiple actuator, only a single lower coil core 6 is provided for all the electromagnets on the underside. This coil core 6 has suitable slots 19 for receiving the windings 8, as well as a hole 18 for each armature shaft 9. A bush 4, which is secured in the lower housing part 3 and guides the corresponding armature shaft 9, lies beneath the coil core 6, aligned with each hole 18. The slots 19 interact with corresponding profiling on the inner wall of the lower housing part 3, resulting in pockets for the windings 8, as can be seen clearly from FIG. 3. The connections 20 of the windings 8 project outward through corresponding openings, so that it is possible to make contact with them and connect them to the driver circuits. Bores 17, through which the stud bolts 58 which connect the housing parts to one another and to the cylinder head 60 of the internal-combustion engine run, are provided in the corners of the lower housing part 3.

The structure described firstly means that the housing underside 15 makes optimum use of the surface area available on the cylinder head 60 of the internal-combustion engine. Consequently, there is no need for separate cooling of the multiple actuator, since there is a large surface area for heat transfer between the lower housing part 3 and the cooled cylinder head 60.

The upper housing part 1 is configured similarly to the lower housing part 3, constructed as shown in FIGS. 2 and 3. Between these two housing parts 1, 3 there is the housing central part 2, which has guide elements 19a that are responsible for the longitudinal guidance of the armature 10 (cf. FIG. 1). This longitudinal guidance eliminates the need for a separate antirotation means, since the armature 10 no longer follows the rotation caused by the springs 12, 68 during their compression.

Good heat transfer from the upper housing part 1 to the lower housing part 3, which is in contact with the cylinder head 60, is possible via the side walls of the housing, for example via the side wall 16 (cf. FIG. 2), which are made from a material of good thermal conductivity, in this case aluminum.

Therefore, the heat loss which arises in the upper electromagnets can be transferred successfully to the housing underside 15, where it is dissipated through contact with the cooled cylinder head 60.

The arrangement of a plurality of armature shafts 9 together with their armatures 10 and the associated electromagnets in a housing enables the stud bolts which are used to attach the housing parts 1, 2 and 3 to one another and to the cylinder head 60 to be moved to the outermost edge of the housing, so that the armatures 10 make optimum use of the available surface area. Consequently, the gas exchange valves can be driven with maximum force.

The fact that the armatures are guided by means of the guide elements 19*a* means that there is no need for separate side guidance cheeks on the coil cores 5, 6, which would reduce the pole surface area and therefore the force which can be applied by the actuator. At the same time, the housing is more stable and the coil cores 5, 6 can be anchored more securely.

In an alternative embodiment, the housing is of two-part design. In this case, it is initially produced in a single part, and then a desired breaking point is scored. The housing is then broken into a top part and a bottom part at this desired breaking point. Then, the bushes 4, the coil cores 5, 6 and the windings 7, 8 are inserted, and the armature shafts 9 together with the armatures 10 are introduced. Next, the top and bottom parts are joined together again, with very high dimensional accuracy being ensured as a result of the broken surface. Furthermore, the considerable degree of meshing ensures that the heat transfer via this broken surface is better than with standard abutting surfaces. Finally, there is no need to machine the contact surfaces, which reduces the manufacturing outlay for the housing. To measure the lift position of the armature 10 and of the valve disk 62 which it drives, the armature 9 is guided out of the upper housing part 1 through the bush 4. A permanent magnet 50 is attached to the armature 9 outside the housing. It is expedient if the armature shaft 9 consists of a substantially nonmagnetic material.

Close to the permanent magnet 50, a magnetic field-sensitive measuring sensor 51 is attached to the housing top side 14 by means of a holder 52 and screws 53. This sensor is a giant MR measuring sensor. However, measuring sensors which operate according to different principles or a combination of measuring sensors, can also be used as measuring sensor 51.

The measuring sensor 51 supplies its output signal, via lines which are not shown in more detail, to evaluation electronics. Its output signal is dependent only on the direction of the field lines of the magnetic field generated by the permanent magnet 50, but is not dependent or is only slightly dependent on the field strength. As a result, the position of the permanent magnet 50 and therefore of the armature 10 and consequently of the valve disk 62 can be determined reliably even in the event of tolerances in terms of the distance between permanent magnet 50 and measuring sensor 51 or in terms of the field strength of the permanent magnet 50.

Since rotation of the armature shaft 9 is ruled out by the armature longitudinal guidance provided by the guide elements 19, a separate antirotation means is not required. For the sake of safety, however, it is possible to use an annular permanent magnet 50 which lies rotationally symmetrically with respect to the axis of the armature shaft 9.

Naturally, it is also possible for a plurality of magnetic field-sensitive measuring sensors 51 to be provided in an arrangement, e.g. a Wheatstone bridge or in a differential arrangement on an armature shaft 9, in order to determine the position of a permanent magnet 50.

In a modification of the configuration according to the invention, the permanent magnet 50 may be fixedly connected to the measuring sensor 51, and the valve shaft 9 or a component attached to it may be made from soft magnetic or ferromagnetic material. This material then moves relative to the measuring sensor which is situated in the air gap between the moving part and the permanent magnet 50.

Figure 4:
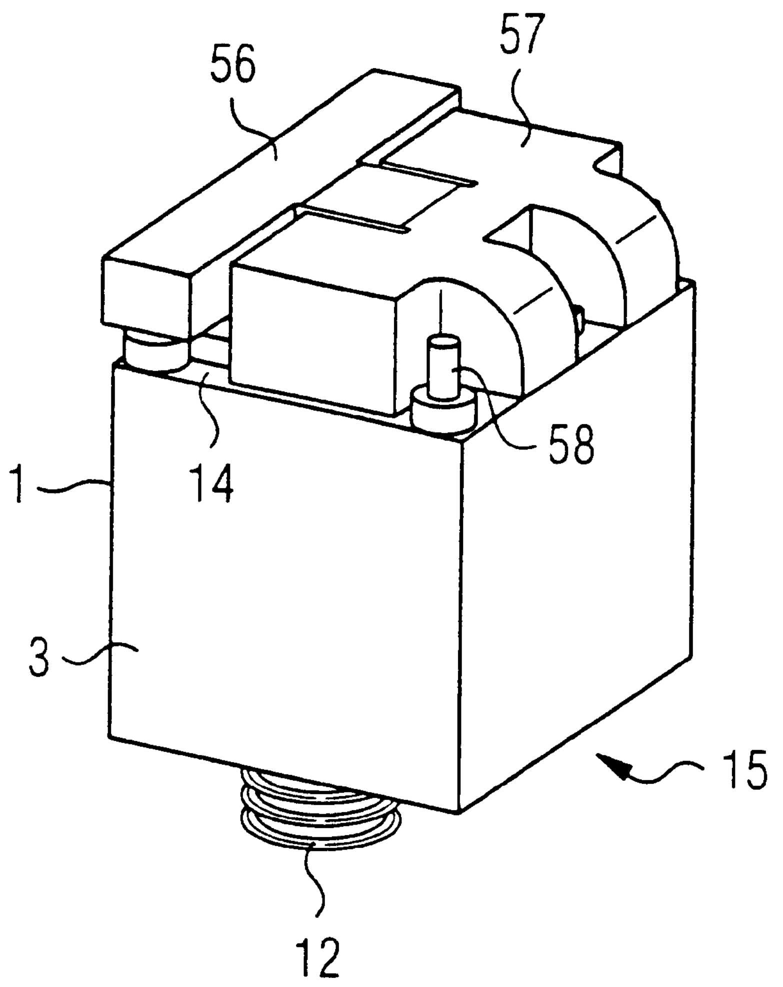
FIG. 4 is a perspective view of a multiple actuator.

Preferably, all the magnetic field-sensitive measuring sensors 51 are shielded from magnetic and electrical interference by a protective cover 57 (cf. FIG. 4). All the magnetic field-sensitive measuring sensors 51 of the multiple actuator are connected to a common connector strip 56, via which contact is made with them in order to supply them with energy and to read their measurement signals.

As an alternative to the double actuators described here, it is also possible for more than two gas exchange valves to be actuated by a single multiple actuator. For example, it is possible for all the valves on the admission side of an internal-combustion engine to be driven by one actuator array. For stability reasons and to improve the guidance of the armatures, it is then possible to provide perpendicular partitions which are formed between the individual actuator parts or double actuators.

We claim:

1. An electromagnetic multiple actuator for at least two gas exchange valves of an internal combustion machine with a cylinder head, comprising:

a housing separate from the cylinder head;

at least two armature shafts extending through said housing and each having an armature and an armature spring cup attached thereto;

two electromagnets for each said armature, each electromagnet having a coil core and a winding with the respective said armature disposed between;

first and second springs respectively acting on each armature in opposite directions and forcing said armature into a position of repose between said electromagnets, and wherein each said first spring is clamped between a part of said housing and said armature spring cup attached to said armature shaft.

2. The multiple actuator according to claim 1, which further comprises guide elements formed on inner sides of said housing, for guiding said armatures along an axis of said armature shafts.

3. The multiple actuator according to claim 1, wherein said housing has a top side and a cooled housing underside in contact with a cooled part, and said housing is formed, on at least one side wall thereof, to assure good heat dissipation from said top side to said cooled housing underside.

4. The multiple actuator according to claim 1, wherein said housing has a housing top side and a housing underside, and each armature shaft is guided in bushes inserted into said housing top side and said housing underside.

5. The multiple actuator according to claim 1, wherein said housing is formed in two parts connected by bolts running through at least one side wall of said housing.

6. The multiple actuator according to claim 5, wherein said housing parts are produced by breaking apart a single-part housing, ensuring that said housing parts fit together.

7. The multiple actuator according to claim 1, wherein a plurality of electromagnets have a common coil core.

8. In combination with a cylinder head of an internal combustion engine, the multiple actuator according to claim 1 for actuating gas exchange valves of the internal combustion engine, wherein said second springs are each clamped between a valve spring cup attached to a valve shaft of the driven gas exchange valve, and the cylinder head wherein the gas exchange valves are guided.

* * * * *